United States Patent [19]

Huspen et al

[11] Patent Number: 4,848,793
[45] Date of Patent: Jul. 18, 1989

[54] CHILD'S SAFETY RESTRAINING VEST
[75] Inventors: Fred J. Huspen, Lora L. Thomas, both of Berrien Springs, Mich
[73] Assignee: T & H, Inc., Berrien Springs, Mich.
[21] Appl. No.: 85,947
[22] Filed: Aug. 17, 1987
[51] Int. Cl.⁴ .............................................. B60R 22/10
[52] U.S. Cl. ................... 280/801; 280/808; 297/484; 297/465
[58] Field of Search ............... 280/801, 808, 803, 806; 297/483, 465, 464, 482, 484, 487, 488

[56] References Cited

U.S. PATENT DOCUMENTS

| | | | |
|---|---|---|---|
| 2,908,324 | 10/1959 | Muller et al. | 297/465 |
| 3,125,375 | 3/1964 | Bird et al. | 297/465 |
| 3,218,103 | 11/1965 | Boyce | 297/465 |
| 3,278,230 | 10/1966 | Boyce et al. | 297/465 |
| 3,301,594 | 1/1967 | Pukish, Jr. | 297/389 |
| 3,321,247 | 5/1967 | Dillender | 297/465 |
| 3,499,681 | 3/1970 | Benitez, Jr. et al. | 297/465 |
| 3,709,558 | 1/1973 | Jakob | 297/484 |
| 3,992,040 | 11/1976 | Gannac | 297/465 |
| 4,026,245 | 5/1977 | Arthur | 119/96 |
| 4,040,664 | 8/1977 | Tanaka et al. | 297/484 |
| 4,050,737 | 9/1977 | Jordan | 297/465 |
| 4,619,468 | 10/1986 | Spill | 297/482 |
| 4,693,495 | 9/1987 | LaPointe | 297/482 |

Primary Examiner—Richard A. Bertsch
Attorney, Agent, or Firm—John C. Cooper, III; Arnold J. Ericsen; C. Thomas Sylke

[57] ABSTRACT

A child's safety vest is disclosed for use in automobiles and other vehicles having lap-belt passenger restraining systems. A stress plate, which attaches to the lap belt, forms a vertical sub-frame to support and secure a waist band and shoulder bands which encircle the child wearer. The stress plate is preferably formed of sheet metal material and a padded front, and the waist and shoulder bands are adjustable to accommodate children of varying sizes.

7 Claims, 1 Drawing Sheet

CHILD'S SAFETY RESTRAINING VEST

BACKGROUND OF THE INVENTION

Conventional automotive passenger restraint systems, as utilized in passenger automobiles intended for the U.S. market, consist of at least a lap-belt assembly which is releasibly attached at one side to a latching means. More commonly, such systems include a combined lap and shoulder belt combination in which the shoulder belt extends at an angle from a lower attachment point near the floor of the vehicle to an upper attachment point above the passenger's shoulder, usually on a door pillar.

Such conventional passenger restraint systems are adequate for large children and adults, but often do not fit a small and immature wearer, particularly one who is active and tempted to play with or unfasten the attachments in an attempt to move about the vehicle while it is moving.

For very young children, infant "car seats" have been manufactured and sold which usually consist of a hollow seat shell in the shape of a small enclosure, usually padded, which is designed to be placed on the vehicle seat and secured to the vehicle's existing lap-belt system. Such infant seats are characterized by a horizontal restraining strap or bar across the chest, together with one or more shoulder straps and a crotch strap extending between the restraining bar and the lower portion of the seat shell. Such infant seats are adequate for a small child of up to about three years and about 50 pounds (18.2 kg) but an older and larger child often finds such a seat too confining and uncomfortable.

Larger child seats have also been marketed which are in effect a small high chair intended to be placed on top of the vehicle seat and secured thereto by the seat belt. These seats are conventionally formed of steel tubing and also incorporate a horizontal restraining bar and crotch strap. The child sits higher, but the vehicle's lap belt must reach up and around the child at a substantial angle to the horizontal. This can expose the occupant to even greater danger because of the seat and occupant can be propelled a considerable distance before reaching the limit of forward movement.

While this high-chair type of seat raises the child's seating position to where he can see out vehicle's windows, many children will still dislike the stigma of being made to sit in what is obviously a child's seat, and will be restless and unmanageable.

Further, the prior art seats described above are characteristically heavy and bulky, and difficult to pack conveniently into a small space when not being used.

SUMMARY OF THE INVENTION

It is therefore a principal object of the present invention to provide a new and improved child's safety restraining vest which accommodates children who are too large for conventional automotive infant seats, while being still too small for the conventional automotive lap and lap-shoulder belt restraining systems intended for adult users.

It is a further object to provide such a safety vest which securely restrains a child wearer in the event of sudden deceleration, and specifically limits forward movement of the child's head.

Another object is to provide such a safety vest which may be constructed of inexpensive sheet metal material and conventional fabric and webbing materials, which may be quickly and easily attached to and detached from an existing lap and lap-shoulder belt system, and which may be easily and compactly stored away when not in use.

DESCRIPTION OF THE DRAWINGS

In the drawings,

Turning to FIG. 1, the safety vest of the present invention is shown in front elevational view. The primary structural element is a stress plate to which a lower belt band and a pair of shoulder bands are attached.

Figure 1:
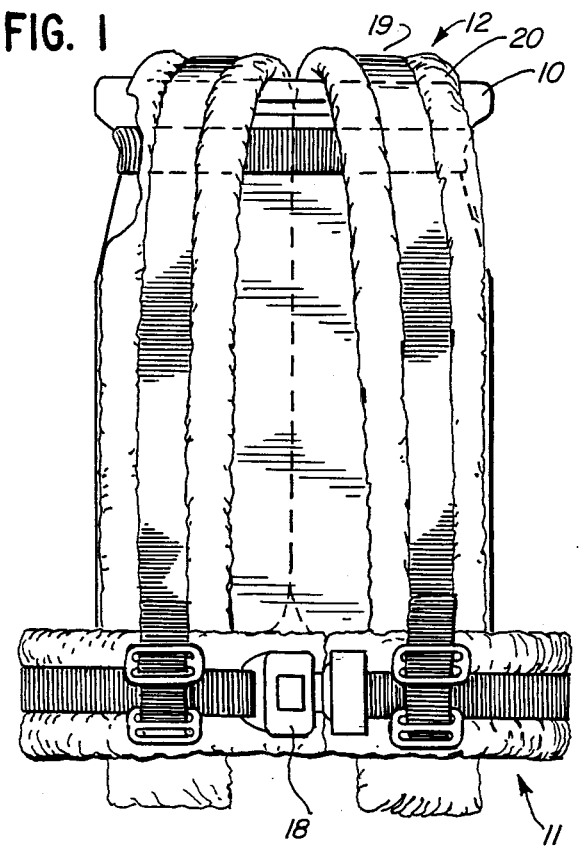
FIG. 1 is a front elevational view of a safety vest constructed according to the invention.
Figure 2:
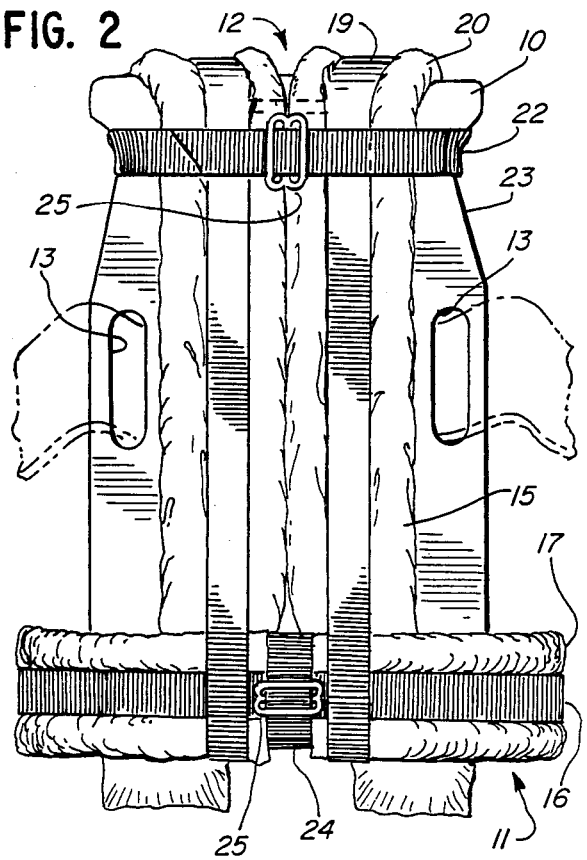
FIG. 2 is a rear elevational view of the safety vest of FIG. 1.
Figure 3:
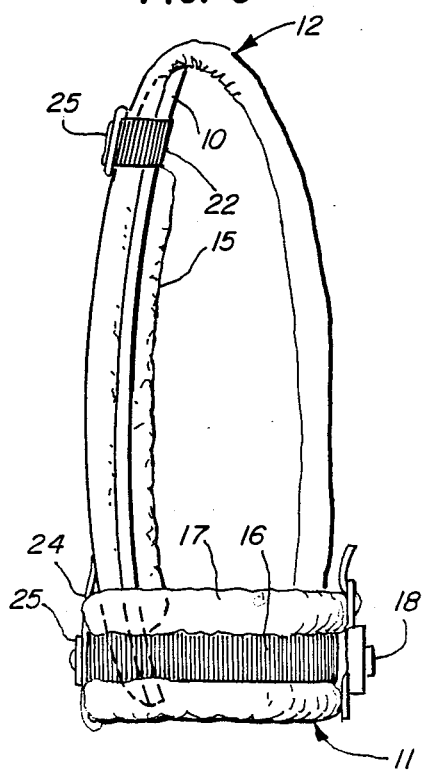
FIG. 3 is a side elevational view of the safety vest of the preceding figures.

According to the invention, and in its preferred embodiment, the stress plate 10 is formed of sheet material such as sheet metal. Alternatively, it can be formed of high-strength molded plastic. In the preferred embodiment, stamped 0.125 inch 6061 aluminum plate is utilized, which may either be anodized in a pleasing color, or covered with decorative cloth. A further advantage of aluminum is that it will undergo plastic deformation under severe impact, absorbing a substantial amount of energy which otherwise might be transferred to the wearer. Large openings 13 are provided in the plate 10 to receive the ends of a conventional automotive lap belt (shown in phantom in FIG. 2). By merely latching the free end of the lap belt to its usual attachment point in the vehicle and tightened to remove any slack, the stress plate 10 is secured snugly against the backrest of the vehicle seat.

Figure 4:
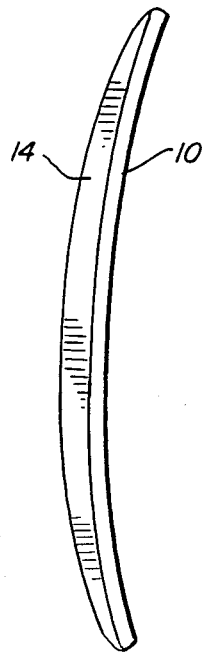
FIG. 4 is a side view of the stress plate which is an element of the safety vest of the preceding figures.
Figure 5:
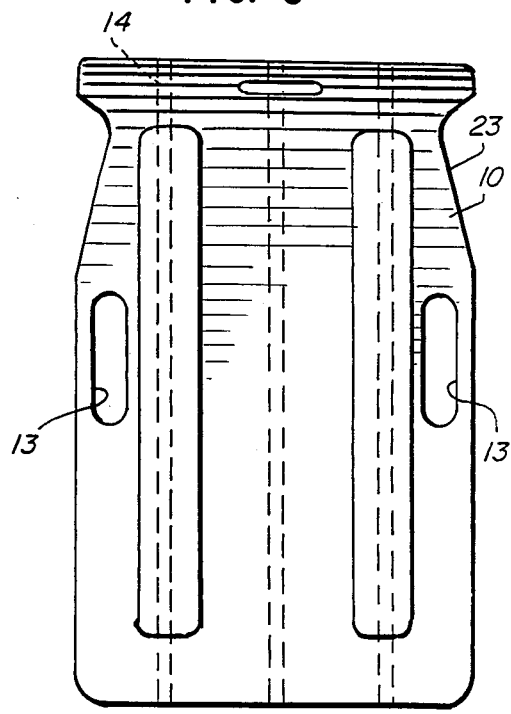
FIG. 5 is a front view of the stress plate of FIG. 4.

Optimally, the stiffness of the stress plate 10 may be further enhanced by making it in the shape of a shallow curve or dish (FIG. 4) which has the additional advantage of making it conform better to the occupant's back. Reinforcing ribs 14 may also provided on the back side of the stress plate 10 to make it resistant to deformation caused by the pull of the belt band 11 and shoulder bands 12 in a sudden deceleration. Finally, in the preferred embodiment there are rolls of padding 15 provided on the front side to afford greater comfort to the user.

The belt band 11 and shoulder bands 12 are preferably of a two-part construction consisting of a first part which is an outer first band of webbing, preferably parachute-grade nylon. The second part is an inner second band, preferably of tubular construction, which is filled with padding material to give it softness and bulk. The first band of webbing therefore serves as a strong but flexible external framework or "skeleton" for the safety vest, while the wider and softer internal bands serve to provide comfort and padding, and to distribute deceleration loads over the wearer's upper torso.

According to the invention, the lower belt 11 comprises a first belt band 16 made of strong webbing which forms a continuous circle around the wearer's waist, with the ends being detachably linked at the front by a quick-release metal or plastic buckle 18 of known design. The wider padded second belt band 17 is stitched with two or more stitched seams longitudinally extending the length of the bands, joining them into a strong unit.

The shoulder bands 12 are of similar construction, with the stronger first shoulder band 19 being secured to the padded second shoulder band 20 with two or more longitudinal stitched seams. Where the shoulder bands 12 meet the belt band 11 in front, the first web shoulder band 19 passes downwardly through an opening under the first web belt band 16 and then upwardly to be secured to itself by a buckle 21 in a conventional manner. The bands 19 are thereby easily adjustable to permit the vest to conform to each individual wearer.

The webbed and padded bands of the shoulder straps 12 are, in the illustrated embodiment, secured to the stress plate 10 by an upper web strap 22 which wraps around the plate 10 and is positioned by indents 23 in the plate. 10. At the bottom, the belt band 11 is secured to the lower portion of the plate 10 by an additional web strap 24 which passes through an appropriate opening 24 in the plate 10. Both web straps 22 and 23 are adjustably and releasibly secured by buckles 25 in a conventional manner.

I claim:

1. In a vehicle having a seat with a safety belt, a child's safety restraining device comprising:
    a stress plate having securing means for receiving the safety belt and securing the stress plate snugly to the seat and the vehicle, said stress plate being the sole means for coupling said vehicle seat and said restraining device, said belt having its ends connected and slack removed therefrom to accomplish said securing;
    said stress plate being generally adapted to fit behind the back of a child wearing said restraining device;
    a waist band for extending circumferentially about a child's waist, said waist band being attached to the lower portion of the stress plate and having releasable buckle means for opening and closing, shoulder bands for restraining a child's shoulders and upper torso, said shoulder bands each being attached at one end to the upper portion of the stress plate and attached at the other end to the waist band.

2. The device of claim 1 in which the stress plate has external reinforcing ribs on its rearward-facing surface.

3. The device of claim 1 in which the stress plate has a concave forward-facing surface to accommodate a child's back.

4. The device of claim 1 in which the stress plate has external forward padding means positioned to cushion a child's back.

5. The device of claim 1 in which each of the waist band and shoulder bands has a web strap and a padded strap, the web strap being external to the padded strap and attached thereto such that the web straps from a flexible external framework surrounding and supporting the padded straps.

6. The device of claim 1 in which the stress plate is made of energy absorbing material.

7. The device of claim 6 in which the energy absorbing material is aluminum sheet stock.

* * * * *